US010200559B2

(12) United States Patent
Watanabe

(10) Patent No.: US 10,200,559 B2
(45) Date of Patent: Feb. 5, 2019

(54) IMAGE SCANNING APPARATUS WITH TWO-SIDED SCANNING, CONTROL METHOD THEREFOR, AND MULTIFUNCTION APPARATUS

(71) Applicant: CANON KABUSHIKI KAISHA, Tokyo (JP)

(72) Inventor: Eiji Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 36 days.

(21) Appl. No.: 15/422,243

(22) Filed: Feb. 1, 2017

(65) Prior Publication Data

US 2017/0237873 A1 Aug. 17, 2017

(30) Foreign Application Priority Data

Feb. 15, 2016 (JP) .................................. 2016-026346

(51) Int. Cl.
*H04N 1/203* (2006.01)
*H04N 1/00* (2006.01)

(52) U.S. Cl.
CPC ....... *H04N 1/2034* (2013.01); *H04N 1/00822* (2013.01); *H04N 2201/0081* (2013.01); *H04N 2201/0094* (2013.01)

(58) Field of Classification Search
None
See application file for complete search history.

(56) References Cited

U.S. PATENT DOCUMENTS

| 8,643,918 | B2 | 2/2014 | Sasaki | ........................... 358/482 |
| 2009/0195842 | A1* | 8/2009 | Sasaki | ..................... H04N 1/031 358/474 |
| 2012/0170083 | A1* | 7/2012 | Joh | ..................... H04N 1/00013 358/475 |

FOREIGN PATENT DOCUMENTS

| JP | 2006-279112 | 10/2006 |
| JP | 2009-188485 | 8/2009 |

\* cited by examiner

*Primary Examiner* — Andrew H Lam
(74) *Attorney, Agent, or Firm* — Venable LLC

(57) ABSTRACT

An image scanning apparatus comprises: a first image scanning unit that performs image scanning of a first surface of an original; a second image scanning unit that performs image scanning of a second surface of the original; and a control unit that controls output channels for outputting analog signals from the first image scanning unit, wherein the control unit changes, between a case of single-sided scanning and a case of both-sided scanning, the output channels of the analog signals output from a part of scanning region in a plurality of scanning regions of the first image scanning unit, and changes, between a case of single-sided scanning and a case of both-sided scanning, the number of output channels for outputting the analog signals from the first image scanning unit.

16 Claims, 14 Drawing Sheets

SENSOR CHIP ARRANGEMENT

BOTH-SIDED 2 PARALLEL
ENABLE SIGNAL = 1
MODE SIGNAL = 0

SINGLE-SIDED 4 PARALLEL FRONT
ENABLE SIGNAL = 1
MODE SIGNAL = 1

SINGLE-SIDED 4 PARALLEL BACK
ENABLE SIGNAL = 0
MODE SIGNAL = 1

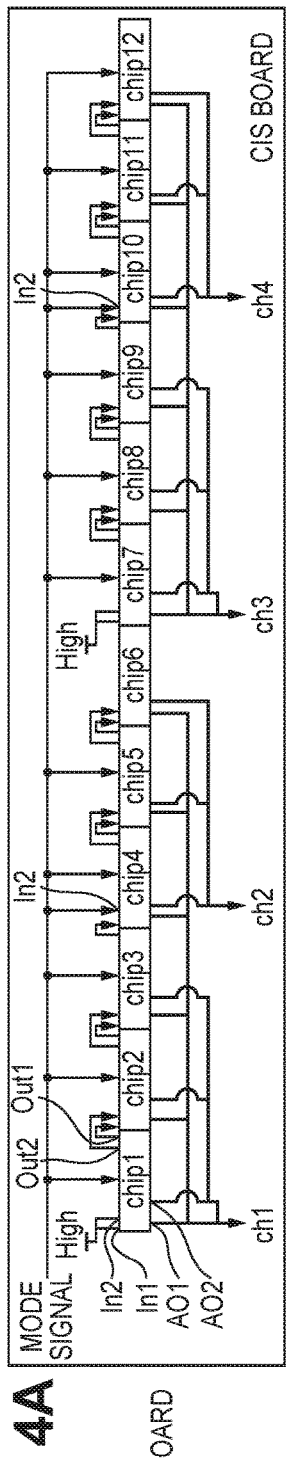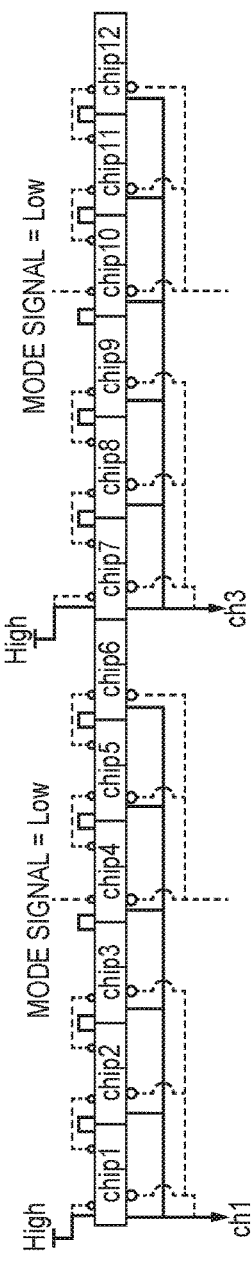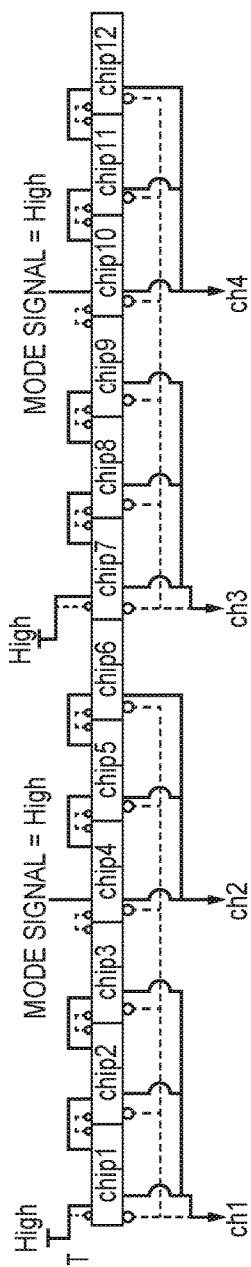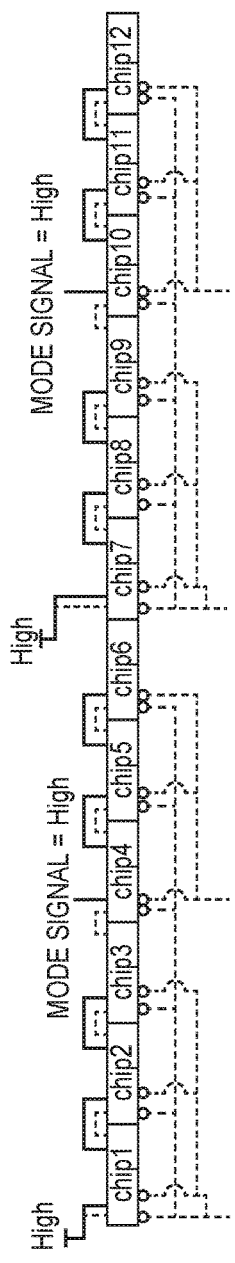
FIG. 4A
FIG. 4B BOTH-SIDED 2 PARALLEL
FRONT SURFACE ENABLE SIGNAL = 1
BACK SURFACE ENABLE SIGNAL = 1
MODE SIGNAL = 0
FIG. 4C SINGLE-SIDED 4 PARALLEL FRONT
FRONT SURFACE ENABLE SIGNAL = 1
BACK SURFACE ENABLE SIGNAL = 0
MODE SIGNAL = 1
FIG. 4D SINGLE-SIDED 4 PARALLEL BACK
FRONT SURFACE ENABLE SIGNAL = 0
BACK SURFACE ENABLE SIGNAL = 1
MODE SIGNAL = 1

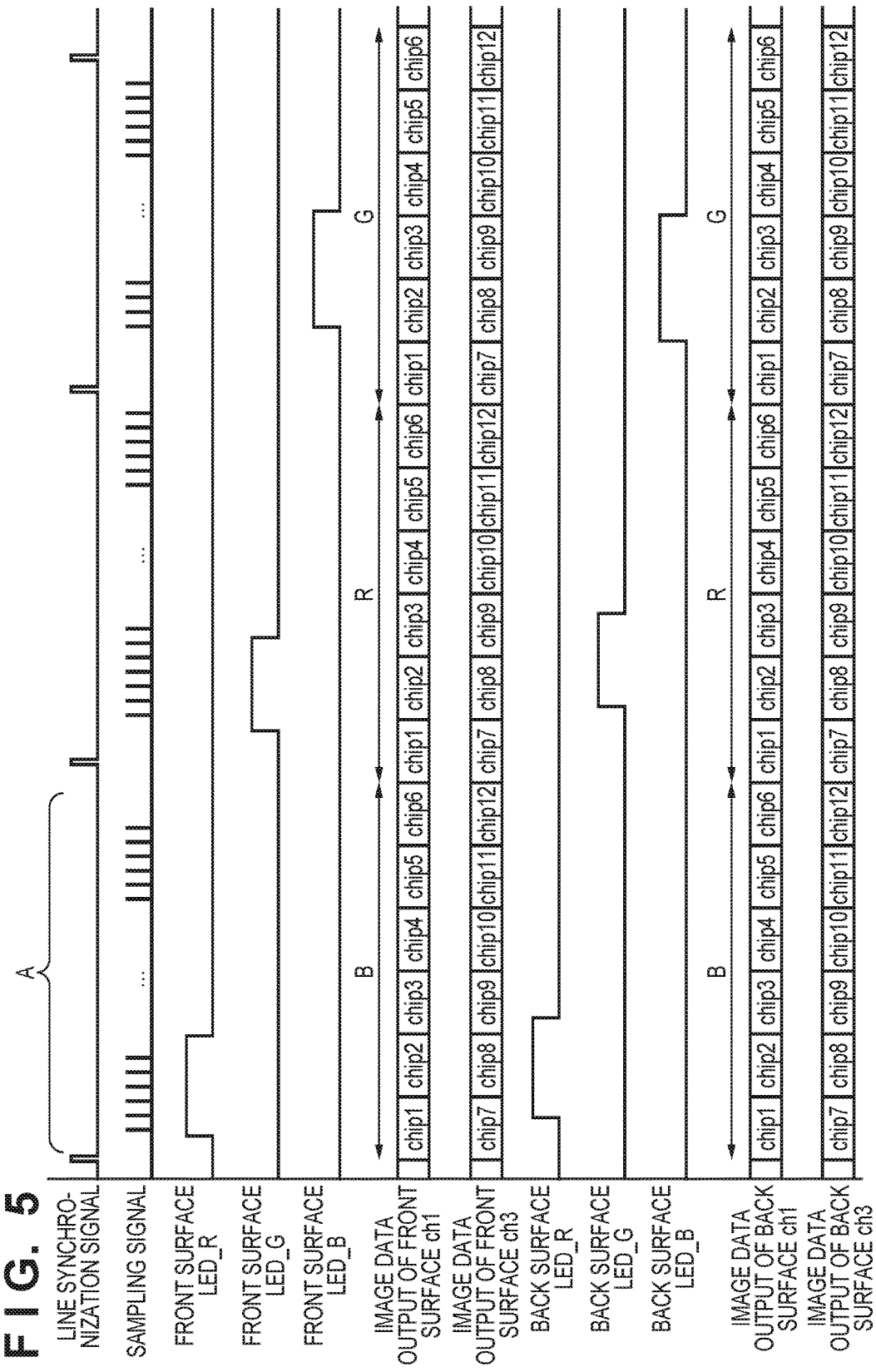

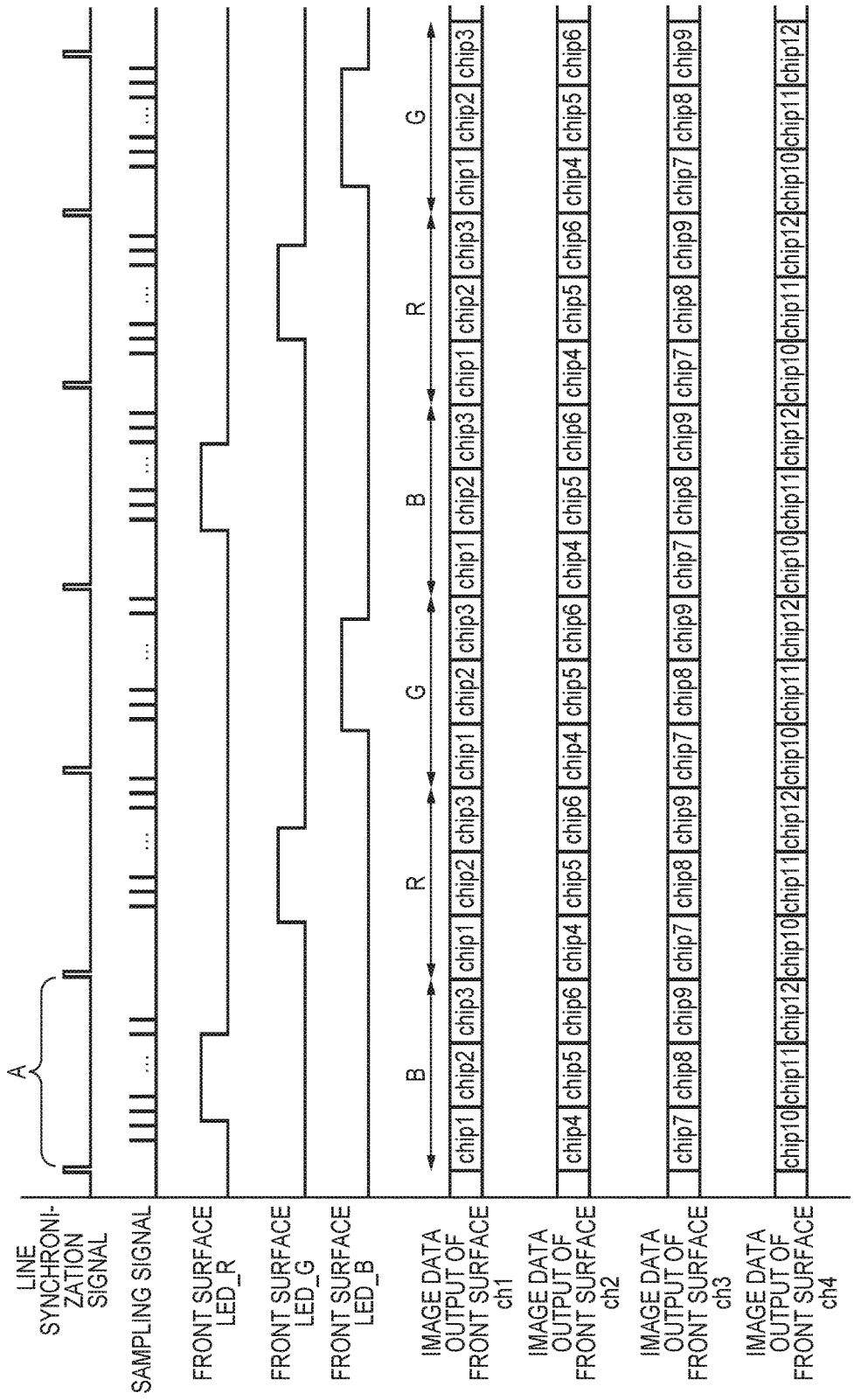

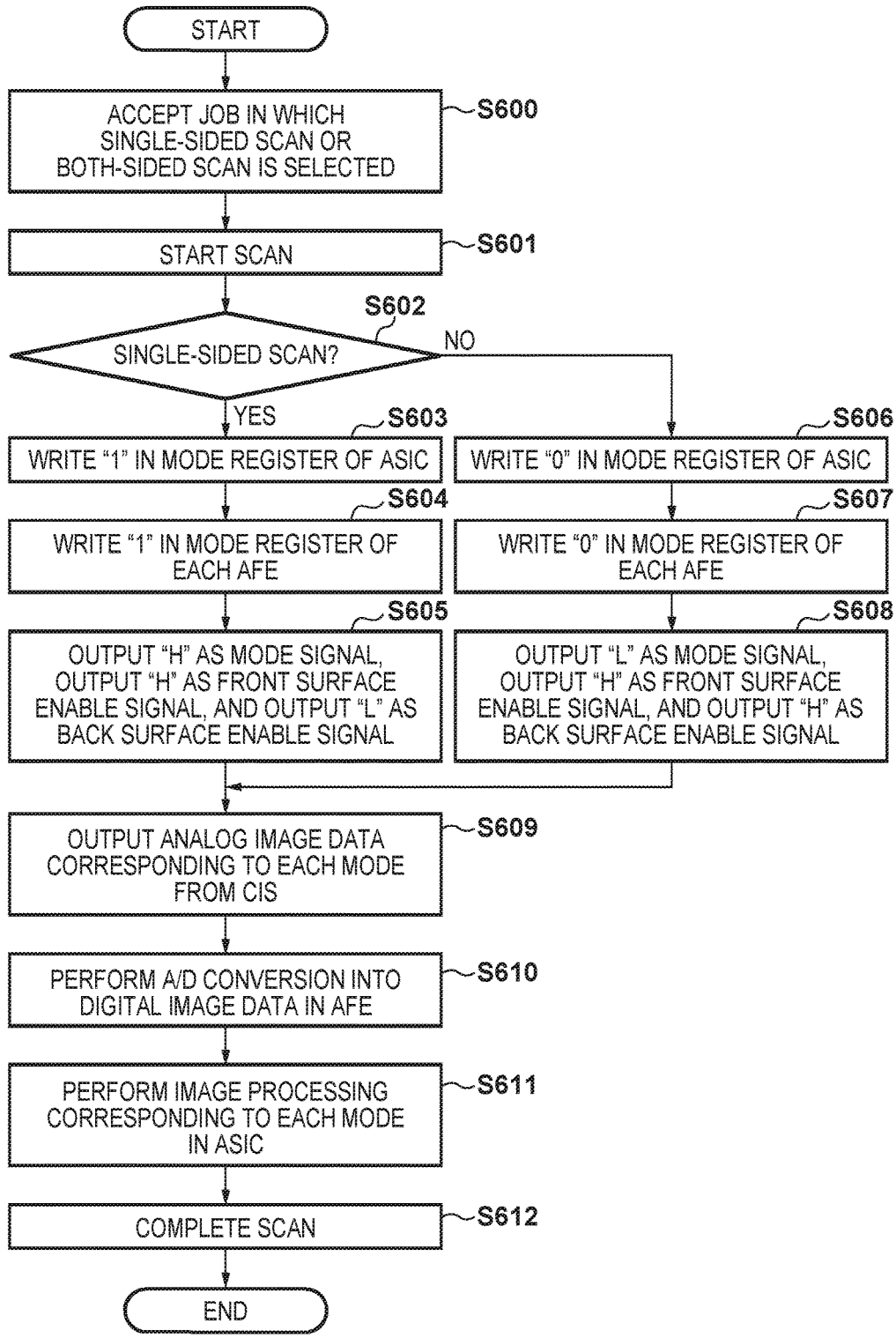

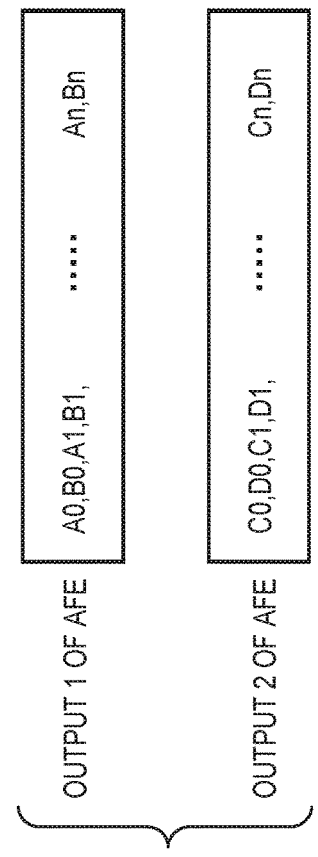
FIG. 14A
FIG. 14B

IMAGE SCANNING APPARATUS WITH TWO-SIDED SCANNING, CONTROL METHOD THEREFOR, AND MULTIFUNCTION APPARATUS

BACKGROUND OF THE INVENTION

Field of the Invention

The present invention relates to an image scanning apparatus, a control method therefor, and a multifunction apparatus.

Description of the Related Art

In recent years, it has been required to increase the scanning speed of an image scanning apparatus. To satisfy this requirement, Japanese Patent Laid-Open No. 2009-188485 proposes a method of parallelly outputting image sensor outputs. Furthermore, Japanese Patent Laid-Open No. 2006-279112 proposes a method in an image scanning apparatus capable of concurrent both-sided scanning.

The image scanning apparatus described in Japanese Patent Laid-Open No. 2009-188485 poses a problem that resources such as an AFE cannot effectively be used at the time of high-resolution interval output. Furthermore, the image scanning apparatus described in Japanese Patent Laid-Open No. 2006-279112 needs to have two conveyance paths, thereby increasing the cost.

SUMMARY OF THE INVENTION

The present invention has been made in consideration of the conventional techniques, and increases the scanning speed at the time of single-sided scanning while suppressing an increase in cost in an image scanning apparatus capable of scanning both sides by one conveyance path.

According to one aspect of the present invention, there is provided an image scanning apparatus which can execute scanning processes of both sides of an original in parallel, comprising: a first image scanning unit configured to perform image scanning of a first surface of the original by receiving reflected light from the first surface and outputting analog signals; a second image scanning unit configured to perform image scanning of a second surface of the original by receiving reflected light from the second surface and outputting analog signals; a control unit configured to control output channels for outputting the analog signals from the first image scanning unit; and a conversion unit configured to convert, into digital signals, the analog signals output from at least one of the first image scanning unit and the second image scanning unit, wherein the control unit changes, between a case of single-sided scanning and a case of both-sided scanning, the output channels of the analog signals output from a part of scanning region in a plurality of scanning regions of the first image scanning unit, and changes, between a case of single-sided scanning and a case of both-sided scanning, the number of output channels for outputting the analog signals from the first image scanning unit.

According to another aspect of the present invention, there is provided a multifunction apparatus including an image scanning apparatus which can execute scanning processes of both sides of an original in parallel, and a printing unit, the image scanning apparatus comprising a first image scanning unit configured to perform image scanning of a first surface of the original by receiving reflected light from the first surface and outputting analog signals, a second image scanning unit configured to perform image scanning of a second surface of the original by receiving reflected light from the second surface and outputting analog signals, a control unit configured to control output channels for outputting the analog signals from the first image scanning unit, and a conversion unit configured to convert, into digital signals, the analog signals output from at least one of the first image scanning unit and the second image scanning unit, wherein the control unit changes, between a case of single-sided scanning and a case of both-sided scanning, the output channels of the analog signals output from a part of scanning region in a plurality of scanning regions of the first image scanning unit, and changes, between a case of single-sided scanning and a case of both-sided scanning, the number of output channels for outputting the analog signals from the first image scanning unit.

According to another aspect of the present invention, there is provided an image scanning apparatus which can execute scanning processes of both sides of an original in parallel, comprising: a first image scanning unit configured to perform image scanning of a first surface of the original by receiving reflected light from the first surface and outputting analog signals; a second image scanning unit configured to perform image scanning of a second surface of the original by receiving reflected light from the second surface and outputting analog signals; a control unit configured to control output channels for outputting the analog signals from the first image scanning unit; and a conversion unit configured to convert, into digital signals, the analog signals output from at least one of the first image scanning unit and the second image scanning unit, wherein the control unit changes, between a case of single-sided scanning and a case of both-sided scanning, the output channels of the analog signals output from a part of scanning region in a plurality of scanning regions of the first image scanning unit.

According to another aspect of the present invention, there is provided an image scanning apparatus which can execute scanning processes of both sides of an original in parallel, comprising: a first image scanning unit configured to perform image scanning of a first surface of the original by receiving reflected light from the first surface and outputting analog signals; a second image scanning unit configured to perform image scanning of a second surface of the original by receiving reflected light from the second surface and outputting analog signals; a control unit configured to control output channels for outputting the analog signals from the first image scanning unit; and a conversion unit configured to convert, into digital signals, the analog signals output from at least one of the first image scanning unit and the second image scanning unit, wherein the control unit changes, between a case of single-sided scanning and a case of both-sided scanning, the output channels of the analog signals output from a part of scanning region in a plurality of scanning regions of the first image scanning unit, and controls the number of output channels for outputting the analog signals from the first image scanning unit so that the number for single-sided scanning is larger than the number for both-sided scanning.

According to another aspect of the present invention, there is provided a control method for an image scanning apparatus which can execute scanning processes of both sides of an original in parallel using a first image scanning unit configured to scan a first surface of the original and a second scanning unit configured to scan a second surface of the original, the first image scanning unit being configured to change output channels for outputting analog signals of the scanned original, the method comprising: controlling the output channels of the first image scanning unit; and converting the analog signals into digital signals, wherein the output channels of the analog signals output from a part of scanning region in a plurality of scanning regions of the first image scanning unit are changed between a case of single-sided scanning and a case of both-sided scanning, and the number of output channels for outputting the analog signals from the first image scanning unit is changed between a case of single-sided scanning and a case of both-sided scanning.

According to the present invention, in an image scanning apparatus capable of concurrent both-sided scanning, contrary to the conventional technique in which the concurrent both-sided scanning speed is almost equal to the single-sided scanning speed, it is possible to increase the single-sided scanning speed while suppressing an increase in cost.

Further features of the present invention will become apparent from the following description of exemplary embodiments (with reference to the attached drawings).

BRIEF DESCRIPTION OF THE DRAWINGS

FIGS. 4A, 4B, 4C, and 4D are views each showing the arrangement of a CIS according to the first embodiment;

FIG. 5 is a timing chart at the time of both-sided scanning according to the first embodiment;

FIG. 8 is a timing chart at the time of single-sided scanning according to the first embodiment;

FIG. 11 is a flowchart illustrating the operation of the image scanning apparatus according to the first embodiment;

FIGS. 14A and 14B are views showing data processing at the time of single-sided scanning according to the second embodiment.

DESCRIPTION OF THE EMBODIMENTS

Embodiments of the present invention will be described below with reference to the accompanying drawings. Note that the relative arrangement of the respective components of an apparatus, the shape of the apparatus, and the like, which are used in the embodiments, are merely examples. The present invention is not limited to them.

<First Embodiment>

The first embodiment of the present invention will be described below.

Figure 1:
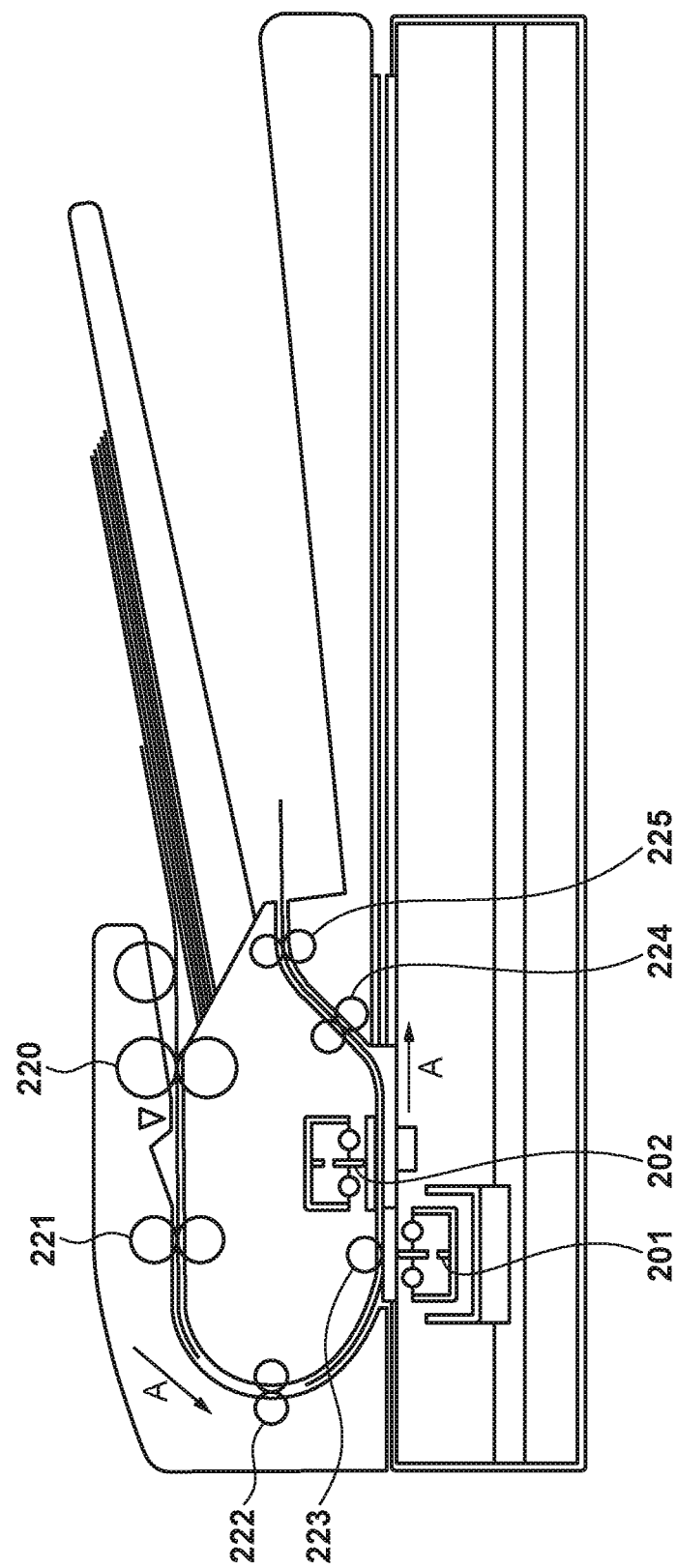
FIG. 1 is a side sectional view showing an image scanning apparatus according to the first embodiment.

FIG. 1 is a side sectional view showing an image scanning apparatus as an example according to the present invention.

The image scanning apparatus according to this embodiment will be described as an apparatus having an arrangement capable of scanning both sides of a scanning target original in parallel. In other words, in this embodiment, the scanning processing of the front surface of the scanning target original and that of the back surface of the original can be executed in parallel.

As shown in FIG. 1, the image scanning apparatus includes a front surface scanner unit 201, a back surface scanner unit 202, and conveyance rollers 220 to 225 for conveying an original. The front surface scanner unit (CIS1) 201 is a device for scanning an image printed on the front surface of the original, and the back surface scanner unit (CIS2) 202 is a device for scanning an image printed on the back surface of the original. When scanning both sides of the original, the image scanning apparatus conveys the scanning target original in the direction of an arrow A by the conveyance rollers 220 to 225. When the conveyed original reaches the scanning position of the front surface scanner unit (CIS1) 201, the front surface scanner unit 201 scans the image on the front surface. More specifically, the front surface of the original is irradiated with irradiation light beams from LEDs as light sources for original illumination provided in the front surface scanner unit 201, and CIS1 scans the reflected light beams, thereby generating analog image data (analog signals). When the original reaches the scanning position of the back surface scanner unit (CIS2) 202, the back surface scanner unit 202 scans the image on the back surface. More specifically, the back surface of the original is irradiated with irradiation light beams from LEDs as light sources for original illumination provided in the back surface scanner unit 202, and CIS2 scans the reflected light beams, thereby generating analog image data (analog signals).

Each of these CISs has a scanning width corresponding to the width of the original. The direction of the scanning width is orthogonal to the arrow A. The orthogonal direction is set as a main scanning direction and the conveyance direction of the original indicated by the arrow A is set as a sub-scanning direction. In this embodiment, by arranging the two CISs to face each other and conveying the original in the direction of the arrow A, the images on both sides of the original can be scanned in parallel. The description assumes that the front and back surfaces of the original are scanned in parallel. However, as shown in FIG. 1, the positions of the CISs need not completely face each other. As long as the CISs are arranged so that the scanning surface of one of the CISs faces that of the other CIS, it is possible to execute both-sided scanning by one conveyance path. In this case as well, the front surface scanning processing and the back surface scanning processing can be executed in parallel. Each scanner unit includes a blue LED, a red LED, and a green LED to scan a color image.

Irradiation light beams from the LEDs provided in CIS1 are reflected by the original, and the reflected light beams are formed on CIS1 via a lens (not shown). CIS1 photoelectrically converts the formed reflected light beams, thereby generating analog image data. On the other hand, irradiation light beams from the LEDs provided in CIS2 are reflected by the original, and the reflected light beams are formed on CIS2 via a lens (not shown). CIS2 photoelectrically converts the formed reflected light beams, thereby generating analog image data.

Figure 2:
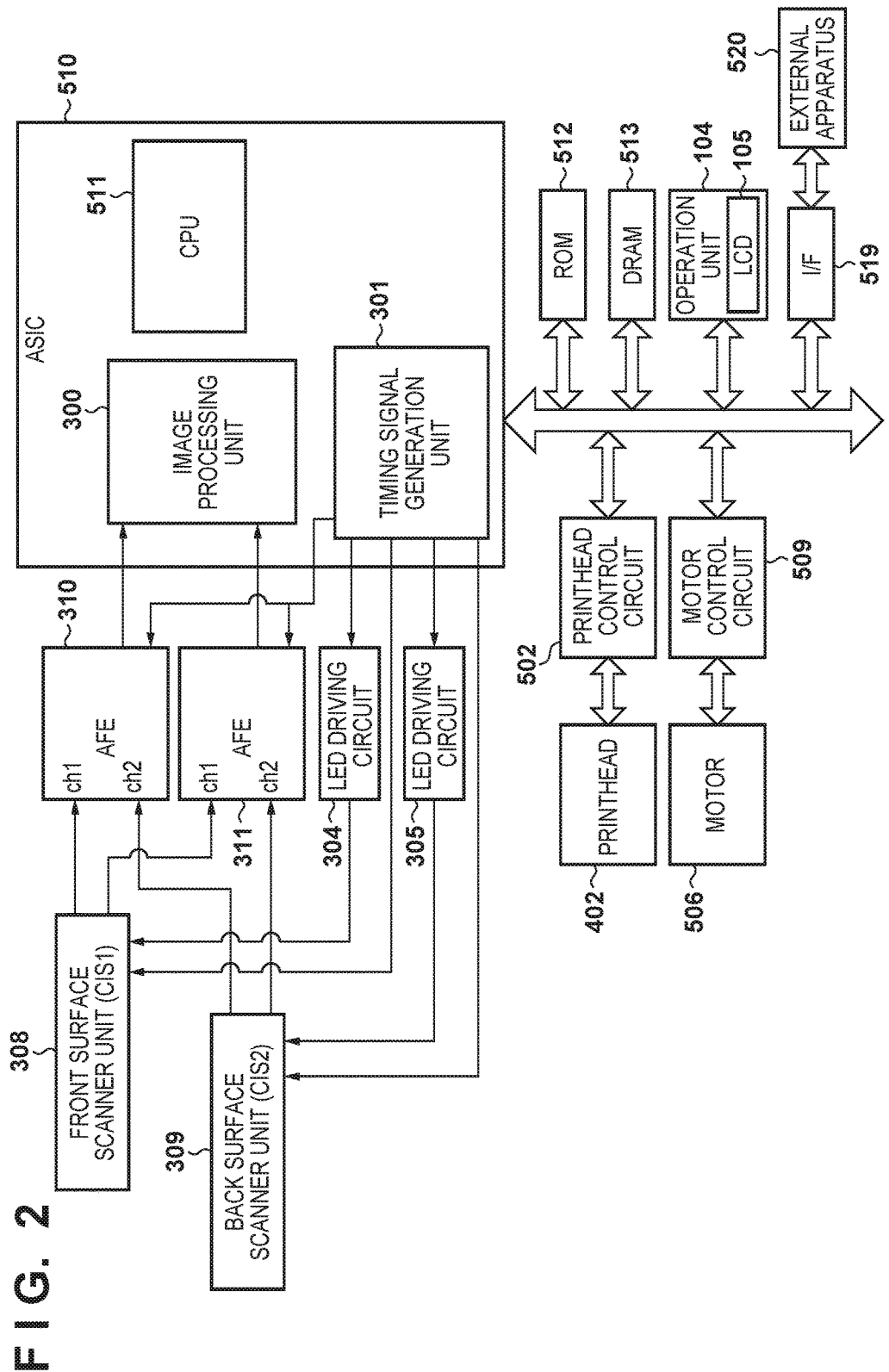
FIG. 2 is a block diagram showing an example of the internal arrangement of a control circuit according to the first embodiment.

FIG. 2 is a block diagram showing an example of the internal arrangement of the control circuit of the image scanning apparatus. A printer having a scanning function and a printing function will be exemplified with reference to FIG. 2. However, the image scanning apparatus according to the present invention is not limited to this, and may be an image scanning apparatus having only the scanning function or a multifunction apparatus additionally having a FAX function and the like.

The printer includes a printhead control circuit 502, a motor control circuit 509, an ASIC 510, a ROM 512, a DRAM 513, an operation unit 104, and an I/F 519, all of which are communicably connected by a system bus.

The ASIC 510 includes an image processing unit 300, a timing signal generation unit 301, and a CPU 511, and controls the overall operations of the respective units. The CPU 511 is a central processing unit in the form of a microprocessor (microcomputer), and controls the overall operation of the printer by executing a program or activating hardware. The ASIC 510 controls an image sensor, a printhead, a motor, and the like.

The ROM 512 is a nonvolatile storage area, and stores a program corresponding to a processing procedure executed by the ASIC 510. The DRAM 513 is a volatile storage area, and is used as the work area of the CPU 511 or temporarily saves image data and parameters to be used by the ASIC 510 to execute the processing procedure.

The operation unit 104 is used by the user to perform various operations, and includes, for example, hard keys and a display unit for presenting various kinds of information to the user (notifying the user of various kinds of information). The operation unit 104 includes an LCD 105 as the display unit. The display unit may be formed from, for example, a touch panel. Furthermore, the operation unit 104 may include a voice generator or the like to allow a sound (for example, buzzer or voice) to be output based on sound information.

The I/F 519 is an interface with an external apparatus 520. For example, a personal computer (PC) is connected to the printer via the I/F 519. The external apparatus 520 is not limited to the PC, and may be another apparatus. It is possible to input/out image data between the printer and the external apparatus via the I/F 519.

The printer further includes a printhead 402, a motor 506, a front surface scanner unit 308, a back surface scanner unit 309, AFEs 310 and 311, and LED driving circuits 304 and 305. Each of the AFEs 310 and 311 can receive analog image data for two channels. That is, each of the AFEs 310 and 311 has two input channels. In other words, each of the AFEs 310 and 311 is connected to two signal lines, and can concurrently receive (parallelly receive) two signals. Note that the front surface scanner unit 308 corresponds to the front surface scanner unit 201 shown in FIG. 1, and the back surface scanner unit 309 corresponds to the back surface scanner unit 202 shown in FIG. 1.

The AFEs 310 and 311 and the LED driving circuits 304 and 305 are connected to the ASIC 510. The printhead 402 and the motor 506 are connected to the ASIC 510 via the printhead control circuit 502 and the motor control circuit 509, respectively. The printhead 402 is a portion for performing a print operation, and the motor 506 is a portion for conveying the original. The front surface scanner unit 308 is a portion for performing an operation of scanning the front surface of the original, and the back surface scanner unit 309 is a portion for performing an operation of scanning the back surface of the original. Each of the front surface scanner unit 308 and the back surface scanner unit 309 is configured to change between 2-ch parallel analog image output and 4-ch parallel analog image output. That is, each of the front surface scanner unit 308 and the back surface scanner unit 309 can change the number of output channels to two or four. The printhead control circuit 502 electrically controls the printhead 402 to generate a driving pulse for discharging ink based on image data. The motor control circuit 509 electrically controls the motor 506 to generate a driving pulse for rotating the motor 506 based on motor driving data. The front surface scanner unit 308, the back surface scanner unit 309, and the AFEs 310 and 311 will be described in detail later.

Figure 3A:
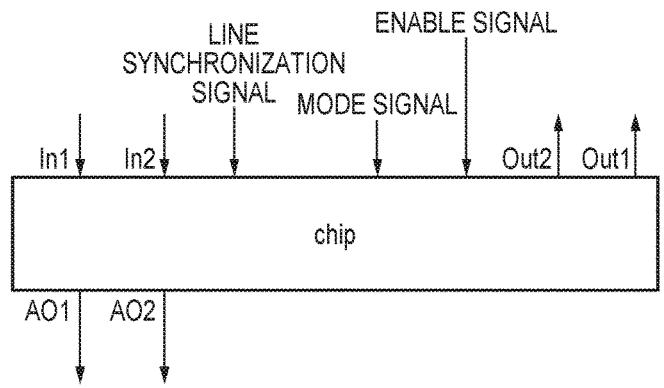
FIGS. 3A, 3B, 3C, and 3D are views each showing the arrangement of a sensor chip according to the first embodiment.

The image sensor according to this embodiment has an arrangement shown in FIG. 4A obtained by arraying sensor chips shown in FIG. 3A on a board (CIS board). Note that line synchronization signals and enable signals are omitted in FIG. 4A.

FIG. 4A shows the arrangement of each CIS. As shown in FIG. 4A, each of CIS1 and CIS2 is connected to four signal lines, and can parallelly output four signals. In other words, each CIS can output analog image data from four terminals. In this example, a description will be provided by assuming that CIS2 can perform 2-ch output or 4-ch output. However, the present invention is not limited to this, and CIS2 may have an arrangement in which 2-ch output can be performed but 4-ch output cannot be performed. The sensor chips determine 2-ch parallel output/4-ch parallel output in accordance with a mode signal, thereby determining an output mode. The mode signal is shared by the respective sensor chips and the front and back scanner units. The sensor chips also determine whether or not to output analog image data based on the enable signals. For example, the sensor chips perform 2-ch parallel output when the mode signal is at "LOW", and perform 4-ch parallel output when the mode signal is at "HIGH". Individual enable signals are input to the front and back scanner units, "HIGH" is input to the image sensor which performs scanning, and "LOW" is input to the image sensor which performs no scanning. The ASIC 510 controls the mode signal and the enable signals.

When performing concurrent both-sided scanning, the ASIC 510 sets the enable signals to "HIGH", and sets the mode signal to "LOW". When performing single-sided scanning, the ASIC 510 sets the enable signal to "HIGH" in the front surface scanner unit 308, and sets the mode signal to "HIGH". Furthermore, the ASIC 510 sets the enable signal to "LOW" in the back surface scanner unit 309, and sets the mode signal to "HIGH".

Figure 3B:
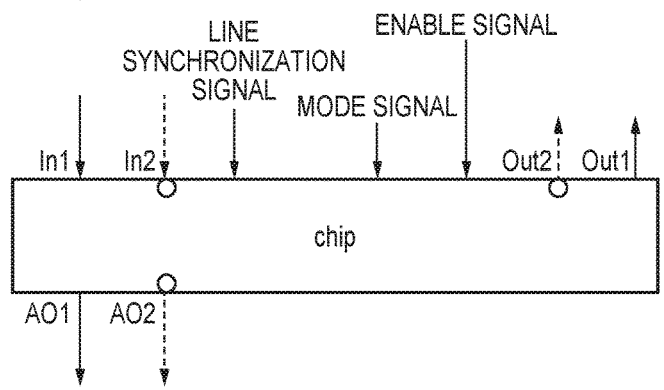

The operations of the sensor chips in a 2-ch parallel output mode will be described. At the time of 2-ch parallel output, the sensor chips are changed, as shown in FIG. 3B. When a line synchronization signal generated by the timing signal generation unit 301 of the ASIC 510 is input, each of all the sensor chips accumulates charges, and holds them in a holding register (not shown). After that, the accumulated charges are sent to a transfer register (not shown) using the next line synchronization signal as a trigger. Data in the transfer register (not shown) is transferred for each pixel using, as a trigger, a start signal input from In1, and output from AO1. At the same time, counting of the number of transferred pixels starts. In consideration of a wiring delay and the like, a transfer completion signal is output from Out1 immediately before the counted number of pixels becomes equal to the total number of pixels of the sensor chip (for example, four pixels before the total number of pixels of one chip). When this transfer completion signal is input to In1 of the adjacent sensor chip, it serves as a start signal for the adjacent sensor chip.

Figure 3C:
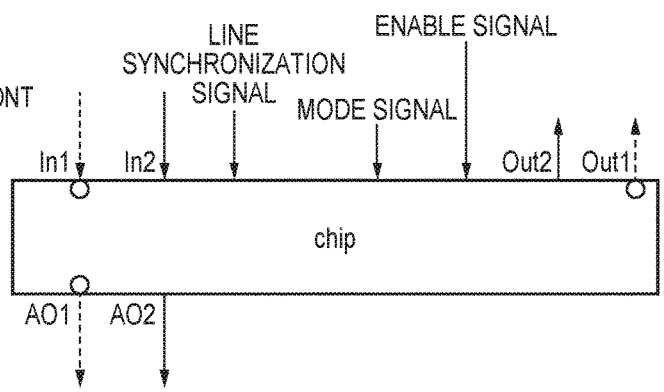

The operations of the sensor chips in a 4-ch parallel output mode will be described. At the time of 4-ch parallel output, the front surface sensor chips are changed, as shown in FIG. 3C. When a line synchronization signal is input, each of all the sensor chips accumulates charges, and holds them in a holding register (not shown). After that, the accumulated charges are sent to a transfer register (not shown) using the next line synchronization signal as a trigger. Data in the transfer register (not shown) is transferred for each pixel using, as a trigger, a start signal input from In2, and output from AO2. At the same time, counting of the number of transferred pixels starts. In consideration of a wiring delay and the like, a transfer completion signal is output from Out2 immediately before the counted number of pixels becomes equal to the total number of pixels of the sensor chip (for example, four pixels before the total number of pixels of one chip). When this transfer completion signal is input to In2 of the adjacent sensor chip, it serves as a start signal for the adjacent sensor chip.

Figure 3D:
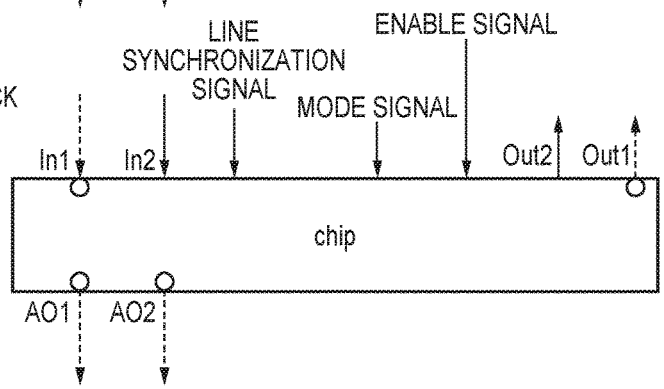

Since the back surface sensor chips are in a disable state (that is, the enable signal=0, that is, LOW) at the time of single-sided scanning, the sensor chips in the back surface scanner unit output no signals from AO1 and AO2, as shown in FIG. 3D. In this embodiment, the signal is input to In2 of each back surface sensor chip at the time of single-sided scanning. However, the signal need not be input from In2. In either case, no signals are output from AO1 and AO2 in accordance with the enable signal.

The CIS has the arrangement shown in FIG. 4A by arraying the sensor chips on the board. For example, 12 sensor chips are arrayed and arranged so as to scan reflected light beams from a scanning target of A4 size (about 18 cm) at once. In this embodiment, in the 2-ch output mode, CHIP1 and CHIP7 serve as start chips. In the 4-ch parallel output mode, CHIP1, CHIP4, CHIP7, and CHIP10 serve as start chips. In1 and In2 of each of CHIP1 and CHIP7 serving as the start chips at the time of 2-ch parallel output are connected to "HIGH", and Out1 and Out2 are connected to In1 and In2 of the right adjacent chip. Each of left adjacent CHIP3 and CHIP9 of the sensor chips (CHIP4 and CHIP10 in the example shown in FIG. 4A) not serving as the start chips at the time of 2-ch parallel output and serving as the start chips at the time of 4-ch parallel output connects In1 and In2 to Out1 and Out2 of the left adjacent chip. Furthermore, each of CHIP3 and CHIP9 connects Out1 to In1 of the right adjacent chip, and sets Out2 in an open state. Each of CHIP4 and CHIP10 not serving as the start chips at the time of 2-ch parallel output and serving as the start chips at the time of 4-ch parallel output connects In1 to Out1 of the left adjacent chip, and inputs the mode signal to In2. Furthermore, each of CHIP4 and CHIP10 connects Out1 and Out2 to In1 and In2 of the right adjacent chip. Each of CHIP6 and CHIP12 serving as end chips at the time of 2-ch parallel output connects In1 and In2 to Out1 and Out2 of the left adjacent chip, and sets Out1 and Out2 in the open state. Each of CHIP2, CHIP5, CHIP8, and CHIP11 as the remaining sensor chips connects In1 and In2 to Out1 and Out2 of the left adjacent chip, and connects Out1 and Out2 to In1 and In2 of the right adjacent chip.

At the time of 2-ch parallel output mode, each of CIS1 and CIS2 performs an operation shown in FIG. 4B. As shown in FIG. 4B, at the time of 2-ch parallel output mode, the analog image data of CHIP1 to CHIP6 are sequentially output from ch1, thereby scanning the left half of the original. The analog image data of CHIP7 to CHIP12 are sequentially output from ch3, thereby scanning the right half of the original.

At the time of 4-ch parallel output mode, CIS1 performs an operation shown in FIG. 4C. As shown in FIG. 4C, at the time of 4-ch parallel output mode, CHIP1 to CHIP3 scan the leftmost ¼ of the original, and sequentially output data from ch1. Furthermore, CHIP4 to CHIP6 scan the second ¼ from the left of the original, and sequentially output data from ch2. CHIP7 to CHIP9 scan the third ¼ from the left of the original, and sequentially output data from ch3. CHIP10 to CHIP12 scan the rightmost ¼ of the original, and sequentially output data from ch4.

At the time of 4-ch parallel output mode, CIS2 performs an operation shown in FIG. 4D. As shown in FIG. 4D, in the disable state (enable signal=0), the output of each sensor chip is in a Hi-Z state.

In the 2-ch parallel output mode, if the line synchronization signal is input, and the data is transferred to the transfer register (not shown), each of all the sensor chips waits for input of the start signal to In1. In each of CHIP1 and CHIP7, "HIGH" is always input to In1, and thus transfer of the analog image data starts. Immediately before the end of transfer in each of CHIP1 and CHIP7, the trigger signal (transfer completion signal) is output from Out1 of the chip to a corresponding one of CHIP2 and CHIP8. Thus, each of CHIP2 and CHIP8 starts to output the analog image data in response to the signal. Similarly, CHIP3 and CHIP9, CHIP4 and CHIP10, CHIP5 and CHIP11, and CHIP6 and CHIP12 output the analog image data in the order named.

In the 4-ch parallel output mode, if the line synchronization signal is input, and the data is sent to the transfer register (not shown) of each of all the sensor chips, each sensor chip waits for input of the start signal to In2. In CIS1, "HIGH" is always input to In2 of each of CHIP1, CHIP4, CHIP7, and CHIP 10, and thus transfer of the analog image data starts. Immediately before the end of transfer in each of CHIP1, CHIP4, CHIP7, and CHIP 10, the trigger signal (transfer completion signal) is output from Out2 of the chip to a corresponding one of CHIP2, CHIP5, CHIP8, and CHIP11. Thus, each of CHIP2, CHIP5, CHIP8, and CHIP11 starts to output the analog image data in response to the signal. Similarly, each of CHIP3, CHIP6, CHIP9, and CHIP12 outputs the analog image data. On the other hand, in CIS2, since the enable signal=0, no analog image data are output from CIS2.

The image scanning apparatus sets CIS1 (front surface scanner unit 308) and CIS2 (back surface scanner unit 309) in the 2-ch parallel output mode, thereby performing concurrent both-sided scanning.

The image scanning apparatus irradiates the scanning target original with light beams from the LEDs, and receives the reflected light beams, thereby performing scanning. The irradiation times of the LEDs are controlled by PWM (Pulse Width Modulation) control. The timing signal generation unit 301 provided in the ASIC 510 generates PWM signals to control the irradiation times of the LEDs of the respective colors. The generated PWM signals of the LEDs of the respective colors are output as indicated by front surface LED_R, front surface LED_G, front surface LED_B, back surface LED_R, back surface LED_G, and back surface LED_B in FIG. 5. The PWM signals for controlling the respective color LEDs for the front surface are transferred to the LED driving circuit 304, and converted into LED driving signals by the LED driving circuit 304. Similarly, the PWM signals for controlling the respective color LEDs for the back surface are transferred to the LED driving circuit 305, and converted into LED driving signals by the LED driving circuit 305. When the LED driving signals are input to the respective color LEDs mounted on CIS1 and CIS2 to control the light amounts of the respective color LEDs, the front and back surfaces of the original are irradiated with light beams from the LEDs.

When CIS1 and CIS2 receive the reflected light beams from the original, the images are scanned. FIG. 5 is a timing chart showing turn-on of the LEDs at the time of concurrent both-sided scanning and the analog image output of the image sensor.

CIS1 scans one line at the period of the line synchronization signal, and turns on the LEDs in an order of the front surface red LED (LED_R), the front surface green LED (LED_G), and the front surface blue LED (LED_B), thereby accumulating charges. The accumulated charges are transferred to the AFE 310 as analog image data during the next line synchronization signal period. The AFE 310 samples/holds the analog image data in synchronism with a sampling signal generated by the timing signal generation unit 301 of the ASIC 510. In the 2-ch parallel output mode, data are sequentially transferred from ch1 of CIS1 from the data of the first pixel of CHIP1. When transfer of all the pixel data of CHIP1 ends, the data of CHIP2 are transferred, and transfer operations are sequentially performed up to CHIP6. Similarly, data are sequentially transferred from ch3 of CIS1 from the first pixel of CHIP7 to CHIP12. For example, during a period "A", irradiation and charge accumulation by the front surface red LED are performed. At the time same, charges obtained by irradiation and charge accumulation by the front surface blue LED on the previous line are transferred to the AFE 310.

Similarly, as for the back surface, CIS2 turns on the LEDs in an order of the back surface red LED (LED_R), the back surface green LED (LED_G), and the back surface blue LED (LED_B), thereby accumulating charges. The accumulated charges are transferred to the AFE 311 as analog image data during the next line synchronization signal period. The AFE 311 samples/holds the analog image data in synchronism with the sampling signal generated by the timing signal generation unit 301 of the ASIC 510. In the 2-ch parallel output mode, data are sequentially transferred from ch1 of CIS2 from the data of the first pixel of CHIP1. When transfer of all the pixel data of CHIP1 ends, the data of CHIP2 are transferred, and transfer operations are sequentially performed up to CHIP6. Similarly, data are sequentially transferred from ch3 of CIS2 from the first pixel of CHIP7 to CHIP12. For example, during the period "A", irradiation and charge accumulation by the back surface red LED are performed. At the time same, charges obtained by irradiation and charge accumulation by the back surface blue LED on the previous line are transferred to the AFE 311.

Figure 6:
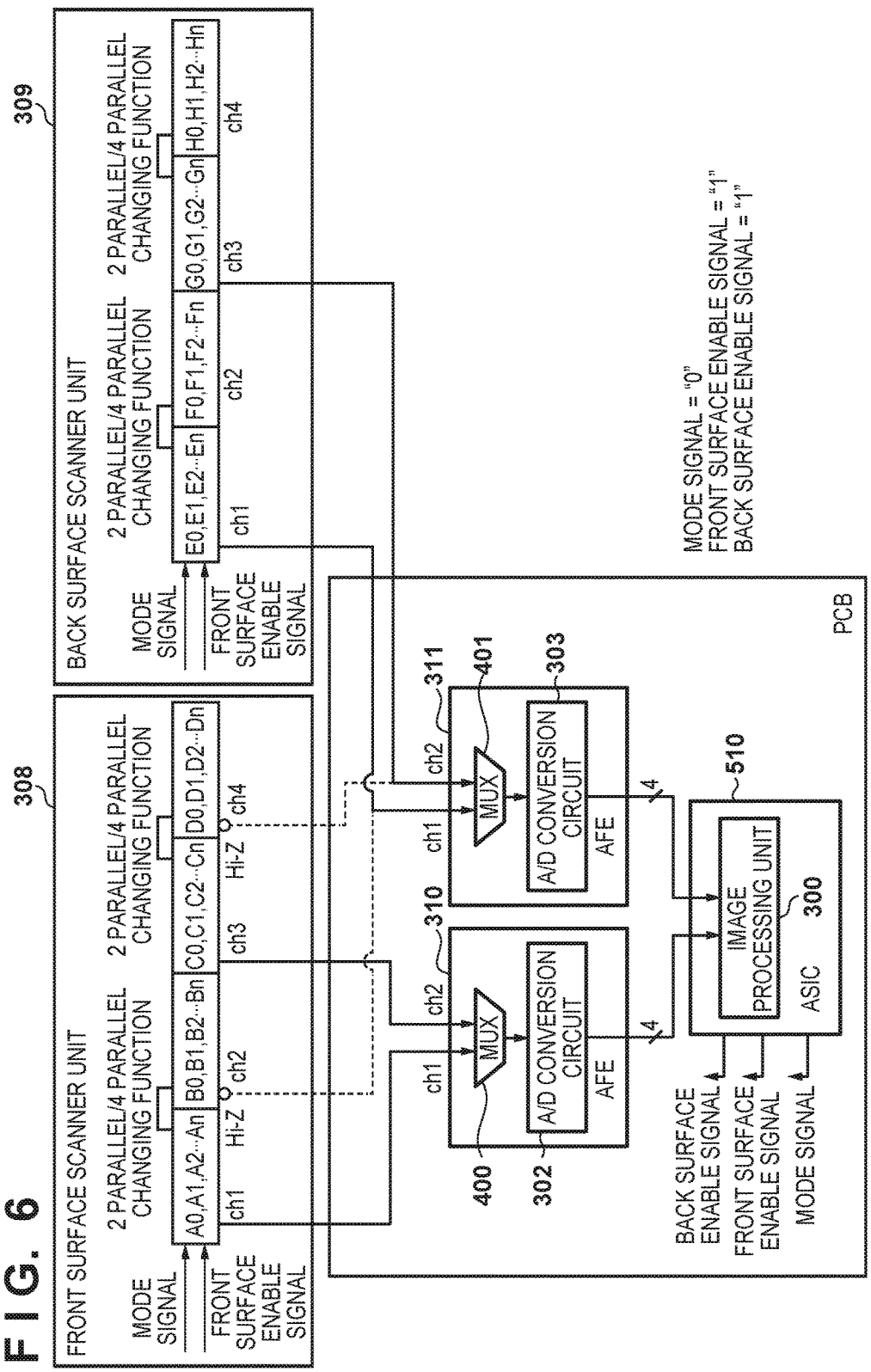
FIG. 6 is a view showing a data flow at the time of both-sided scanning according to the first embodiment.

The data flow of the image scanning apparatus at the time of concurrent both-sided scanning will be described with reference to FIG. 6. The analog image data output from ch1 and ch3 of the front surface scanner unit 308 are input to ch1 and ch2 of the AFE 310, respectively. The AFE 310 samples/holds the analog image data transferred from the front surface scanner unit 308, and performs offset processing and signal amplification. An MUX 400 alternately changes the parallelly input analog image data every time data of one pixel (16 bits) is transferred, and transfers the analog image data to an A/D conversion circuit 302. The A/D conversion circuit 302 converts the transferred analog image data into digital image data (digital signal), and outputs it with a 4-bit width to the image processing unit 300. Note that sampling/holding, offset processing, signal amplification, and A/D conversion are often integrally implemented by an IC, and the IC is called an AFE (Analog Front End).

Figure 7A:
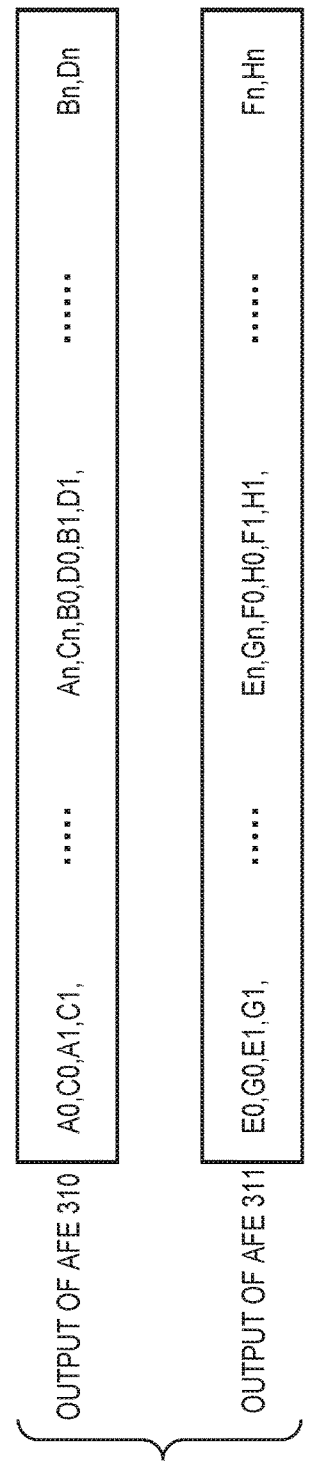
FIGS. 7A and 7B are views showing data processing at the time of both-sided scanning according to the first embodiment.
Figure 7B:
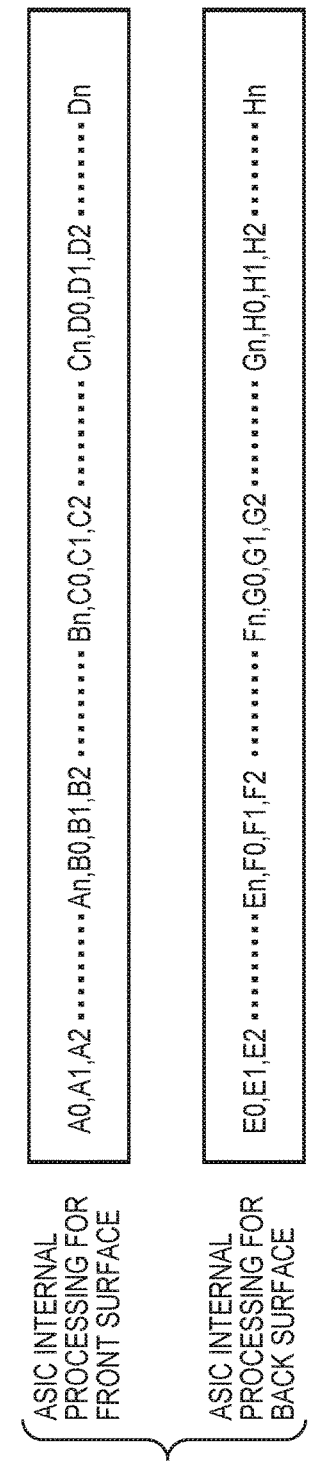

Assume that the analog image data are output from ch1 of the front surface scanner unit 308 in an order of A0, A1, A2, . . . , An, B0, B1, B2, . . . , and Bn. Assume also that the analog image data are output from ch3 in the order of C0, C1, C2, . . . , Cn, D0, D1, D2, . . . , and Dn. In this case, as shown in FIG. 7A, data are output from the AFE 310 in an order of A0, C0, A1, C1, . . . , An, Cn, B0, D0, B1, D1, . . . , Bn, and Dn. Note that no analog image data are output from ch2 and ch4 of the front surface scanner unit 308. The AFE 310 transfers the data to the image processing unit 300 incorporated in the ASIC 510. To form an image, the image processing unit 300 sorts the data in an order of A0, A1, A2, . . . , An, B0, B1, B2, . . . , Bn, C0, C1, C2, . . . , Cn, D0, D1, D2, . . . , and Dn, as indicated by front surface ASIC internal processing in FIG. 7B. The sort method can be defined by the input order of the AFE. That is, since the input order of the data is determined based on the connection arrangement of the chips of each CIS, the data are sorted in a predetermined order. Furthermore, the image processing unit 300 performs various image processes such as enlargement and reduction.

Similarly, the back surface scanner unit 309 converts the reflected light beams from the original into analog image data, and transfers them to the AFE 310 in the 2-ch parallel output mode. The analog image data output from ch1 and ch3 of the back surface scanner unit 309 are input to ch1 and ch2 of the AFE 311, respectively. The AFE 311 samples/holds the data transferred from the back surface scanner unit 309, and performs offset processing and signal amplification. An MUX 401 alternately changes the parallelly input analog image data every time data of one pixel (16 bits) is transferred, and transfers the analog image data to an A/D conversion circuit 303. The A/D conversion circuit 303 converts the transferred analog image data into digital image data (digital signal), and outputs it with a 4-bit width to the image processing unit 300.

Assume that the analog image data are output from ch1 of the back surface scanner unit 309 in an order of E0, E1, E2, . . . , En, F0, F1, F2, . . . , and Fn. Assume also that the analog image data are output from ch3 in an order of G0, G1, G2, . . . , Gn, H0, H1, H2, . . . , and Hn. In this case, as shown in FIG. 7A, the AFE 311 outputs the data in an order of E0, G0, E1, G1, . . . , En, Gn, F0, H0, F1, H1, . . . , Fn, and Hn. The AFE 311 transfers the data to the image processing unit 300 incorporated in the ASIC 510. To form an image, the image processing unit 300 sorts the data in an order of E0, E1, E2, . . . , En, F0, F1, F2, . . . , Fn, G0, G1, G2, . . . , Gn, H0, H1, H2, . . . , and Hn, as indicated by back surface ASIC internal processing in FIG. 7B. In this case as well, since the input order of the data is determined based on the connection arrangement of the chips of each CIS, the data are sorted in the predetermined order. Furthermore, the image processing unit 300 performs various image processes such as enlargement and reduction.

The image scanning apparatus can concurrently scan both sides of the original by parallelly processing the data output from the front surface scanner unit 308 and the back surface scanner unit 309.

Single-sided scanning will be described next. The image scanning apparatus sets CIS1 (front surface scanner unit 308) in the 4-ch parallel output mode, and sets CIS2 (back surface scanner unit 309) in the disable state, thereby performing single-sided high-speed scanning.

The image scanning apparatus irradiates the scanning target original with light beams from the LEDs, and CIS1 receives the reflected light beams, thereby scanning the image. FIG. 8 is a timing chart showing turn-on of the LEDs at the time of single-sided scanning and the analog image output of the image sensor.

The timing signal generation unit 301 of the ASIC 510 generates a line synchronization signal. In this embodiment, as will be described later, it is possible to output the data within a time half that of the both-sided scanning. Thus, the line synchronization signal is set to have a period about half that of concurrent both-sided scanning. CIS1 scans one line at the period of the line synchronization signal, and turns on the LEDs in an order of the front surface red LED (LED_R), the front surface green LED (LED_G), and the front surface blue LED (LED_B), thereby accumulating charges. The accumulated charges are transferred to the AFE 310 as analog image data during the next line synchronization signal period.

The AFE 310 samples/holds the analog image data in synchronism with the sampling signal generated by the timing signal generation unit 301 of the ASIC 510. In the 4-ch parallel output mode, data are sequentially transferred from ch1 of CIS1 from the data of the first pixel of CHIP1. When transfer of all the pixel data of CHIP1 ends, the data of CHIP2 are transferred, and transfer operations are sequentially performed up to CHIP3. Similarly, the data of CHIP4 to CHIP6 are sequentially transferred from ch2 of CIS1. The data of CHIP7 to CHIP9 are sequentially transferred from ch3 of CIS1. The data of CHIP10 to CHIP12 are sequentially transferred from ch4 of CIS1. The output of CIS2 is in the Hi-Z state.

For example, during a period "A", irradiation and charge accumulation by the front surface red LED are performed. At the time same, charges obtained by irradiation and charge accumulation by the front surface blue LED on the previous line are externally transferred. The accumulated charges are transferred as analog image data to each AFE during the next line synchronization signal period. When comparing FIGS. 5 and 8, it is apparent that the time taken to transfer the data of CHIP1 to CHIP12 at the time of single-sided scanning is half that at the time of concurrent both-sided scanning. That is, the scanning speed is twice.

Figure 9:
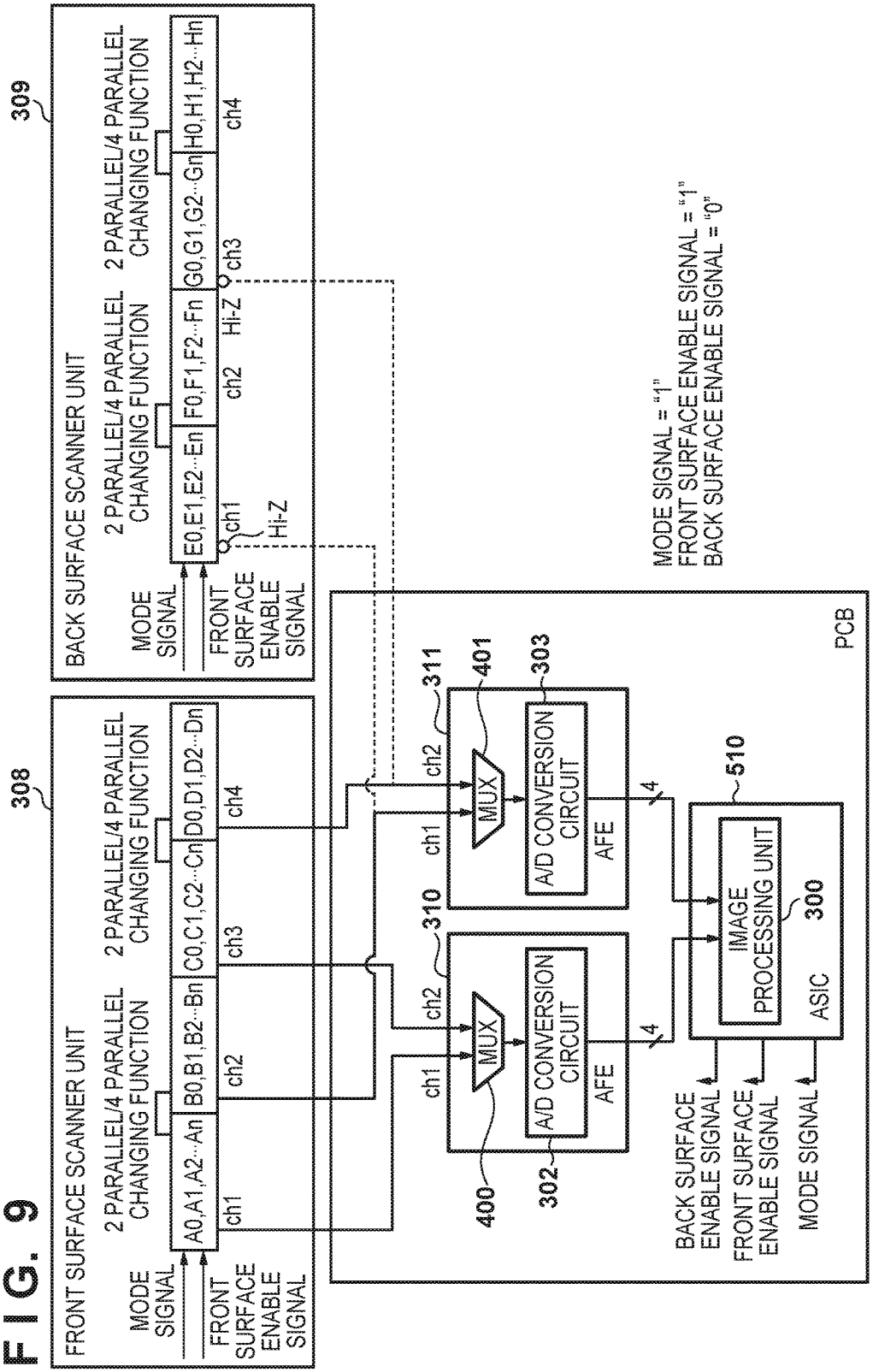
FIG. 9 is a view showing a data flow at the time of single-sided scanning according to the first embodiment.

The data flow at the time of single-sided scanning will be described in detail with reference to FIG. 9. The front surface scanner unit 308 converts, into analog image data, the reflected light beams of the light beams with which the original is irradiated, and transfers them to the AFEs 310 and 311 in the 4-ch parallel output mode. The analog image data output from ch1 and ch3 of the front surface scanner unit 308 are input to ch1 and ch2 of the AFE 310, respectively. The analog image data output from ch2 and ch4 of the front surface scanner unit 308 are input to ch1 and ch2 of the AFE 311, respectively. Each of the AFEs 310 and 311 samples/holds the analog image data transferred from CIS1, and performs offset processing and signal amplification. Each of the MUXs 400 and 401 changes the parallelly input analog image data every time data of one pixel (16 bits) is transferred, and transfers the analog image data to a corresponding one of the A/D conversion circuits 302 and 303. Each of the A/D conversion circuits 302 and 303 converts the transferred analog image data into digital image data, and outputs it with a 4-bit width to the image processing unit 300.

Figure 10A:
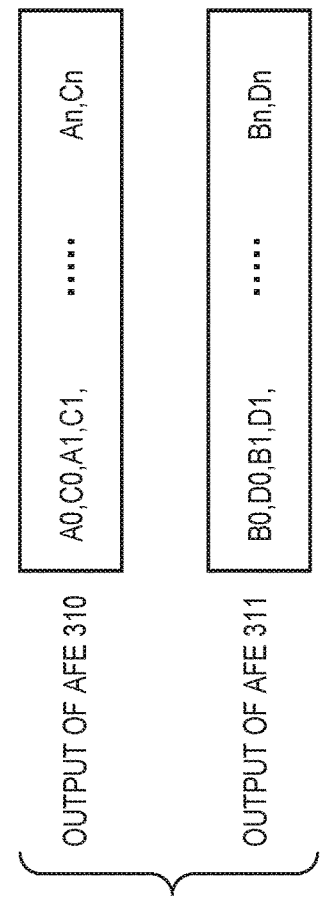
FIGS. 10A and 10B are views showing data processing at the time of single-sided scanning according to the first embodiment.
Figure 10B:
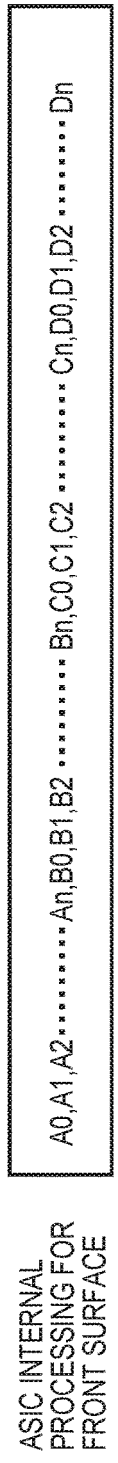

The analog image data are output from ch1 of the front surface scanner unit 308 in an order of A0, A1, A2, . . . , and An. The analog image data are output from ch2 of the front surface scanner unit 308 in an order of B0, B1, B2, . . . , and Bn. The analog image data are output from ch3 of the front surface scanner unit 308 in an order of C0, C1, C2, . . . , and Cn. The analog image data are output from ch4 of the front surface scanner unit 308 in an order of D0, D1, D2, . . . , and Dn. That is, the analog image data are output from all the channels (ch1 to ch4) of the front surface scanner unit 308. In this case, as shown in FIG. 10A, data are output from the AFE 310 in an order of A0, C0, A1, C1, . . . , An, and Cn, and data are output from the AFE 311 in an order of B0, D0, B1, D1, . . . , Bn, and Dn. To form an image, the image processing unit 300 sorts the data in an order of A0, A1, A2, . . . , An, B0, B1, B2, . . . , Bn, C0, C1, C2, . . . , Cn, D0, D1, D2, . . . , and Dn, as shown in FIG. 10B. The image processing unit 300 is a circuit capable of 4-ch parallel processing, and can thus perform 4-ch parallel processing.

As described above, in this embodiment, at the time of single-sided scanning, the number of channels output from the front surface scanner unit 308 is increased. Instead of the back surface scanner unit 309, the front surface scanner unit 308 uses the AFE 311 which is used by the back surface scanner unit 309 at the time of both-sided scanning. That is, at the time of both-sided scanning, the front surface scanner unit 308 uses both the AFEs 310 and 311 to use the AFE 311 at either the time of single-sided scanning or the time of both-sided scanning. This can reduce the time taken to output the digital image data to the image processing unit 300 at the time of single-sided scanning to half that at the time of both-sided scanning.

[Operation Procedure]

FIG. 11 shows the operation procedure of the image scanning apparatus according to this embodiment. FIG. 11 shows control procedure of the image scanning apparatus executed by the ASIC 510.

In step S600, the image scanning apparatus accepts a single-sided scan job or both-sided scan job input by the user operation of the external apparatus 520 or the operation unit 104 of the image scanning apparatus. The job may include a copy of a scanned image.

In step S601, the image scanning apparatus starts a scan operation based on the accepted job.

In step S602, the CPU 511 determines which of a single-sided scan and a concurrent both-sided scan is selected in the accepted job. If the single-sided scan is selected (YES in step S602), the process advances to step S603. If the both-sided scan is selected (NO in step S602), the process advances to step S606.

In step S603, the CPU 511 writes "1" in the mode register (not shown) of the ASIC 510.

In step S604, the ASIC 510 sets "1" in the mode register (not shown) of each AFE using a serial command or the like.

In step S605, based on the setting in the mode register of the ASIC 510, the ASIC 510 outputs "HIGH" to the mode signal of the image sensor, "HIGH" to the front surface enable signal, and "LOW" to the back surface enable signal. After that, the process advances to step S609.

In step S606, the CPU 511 writes "0" in the mode register (not shown) of the ASIC 510.

In step S607, the ASIC 510 sets "0" in the mode register (not shown) of each AFE using a serial command or the like.

In step S608, based on the setting in the mode register of the ASIC 510, the ASIC 510 outputs "LOW" to the mode signal of the image sensor, "HIGH" to the front surface enable signal, and "HIGH" to the back surface enable signal. After that, the process advances to step S609.

In step S609, the CIS outputs analog image data corresponding to each mode in accordance with the set signals. For example, if the single-sided scan is selected, only the front surface scanner unit 308 outputs the analog image data. If no single-sided scan is selected (the both-sided scan is selected), the front surface scanner unit 308 and the back surface scanner unit 309 output the analog image data.

In step S610, based on the setting in the mode register of each AFE, the AFE converts the analog image data output from the CIS into digital image data, thereby performing A/D conversion.

In step S611, the ASIC 510 performs image processing corresponding to each mode using the digital image data converted in step S610. Note that if the both-sided scan is selected, steps S609 to S611 are executed by the method described with reference to FIGS. 5 to 7B. If the single-sided scan is selected, steps S609 to S611 are executed by the method described with reference to FIGS. 8 to 10B. The processing procedure then ends.

As described above, according to this embodiment, the image scanning apparatus capable of concurrent both-sided scanning can improve the single-sided scanning speed, as compared with the conventional techniques.

Note that in this embodiment, in both-sided scanning/single-sided scanning, control is performed to change the output of the front surface scanner unit between 2-ch output and 4-ch output. The present invention, however, is not limited to this. For example, the output may be changed to another number of channels in accordance with a paper size processed by the image scanning apparatus.

<Second Embodiment>

The second embodiment of the present invention will be described.

Figure 12:
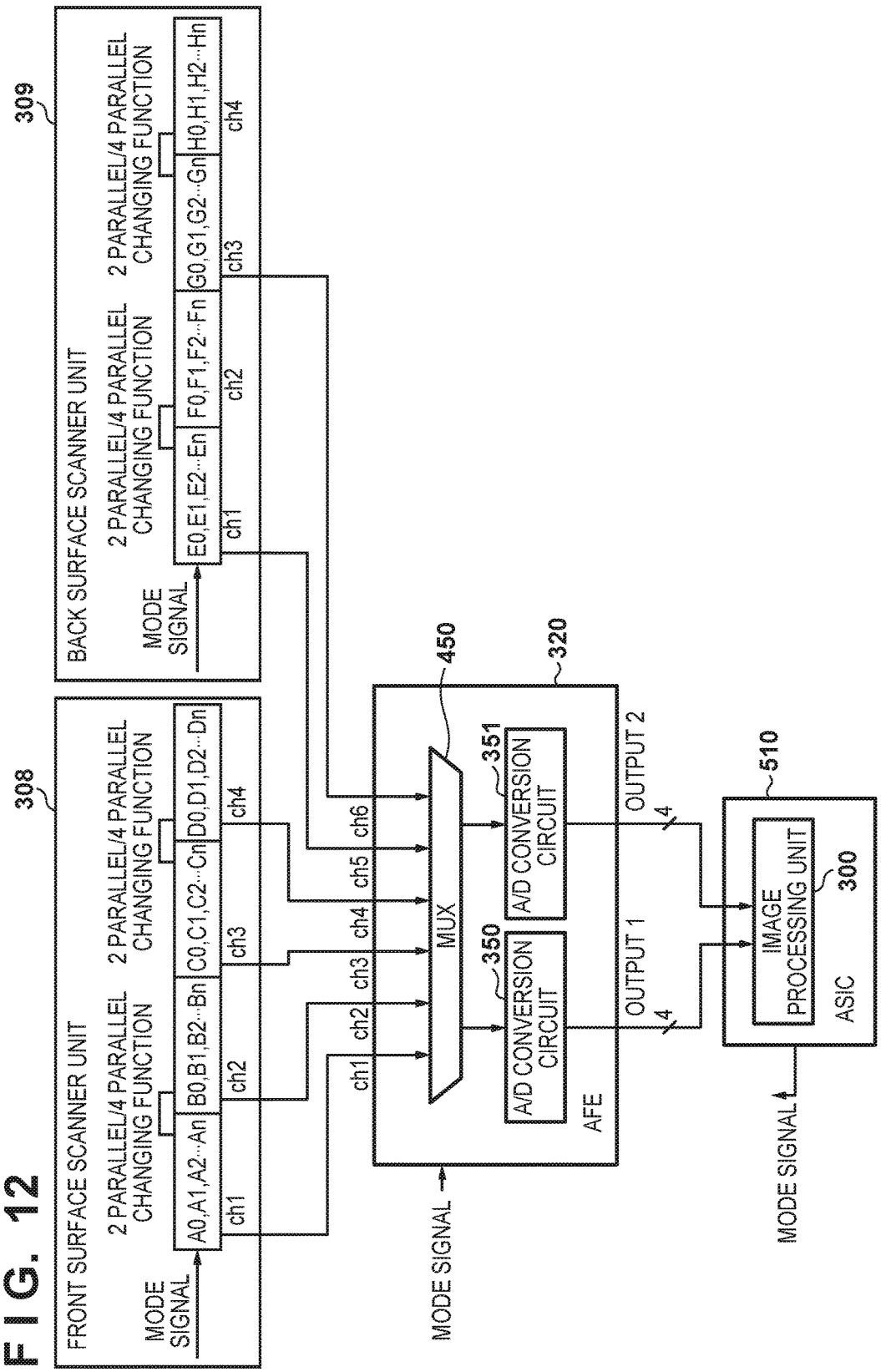
FIG. 12 is a view showing an arrangement according to the second embodiment.

FIG. 12 shows an example of the arrangement of an image scanning apparatus according to the second embodiment of the present invention.

In this embodiment, one AFE and two scanner units (CISs) are included. An AFE 320 can input analog image data of four channels from a front surface scanner unit 308 and analog image data of two channels from a back surface scanner unit 309, that is, analog image data of six channels in total. That is, the number of input channels of the AFE 320 is given by the sum of the maximum number of output channels from which the front surface scanner unit 308 can output data and the number of output channels from which the back surface scanner unit 309 outputs data at the time of both-sided scanning. Furthermore, in accordance with a mode signal input from an ASIC 510, an MUX 450 selects two channels from the input signals of the six channels. A/D conversion circuits 350 and 351 respectively A/D-convert the analog image data of the selected two channels into digital image data, and transfer them to an image processing unit. Thus, the AFE 320 according to this embodiment has a 6-input/2-output arrangement.

Both-sided scanning will first be described. The image scanning apparatus sets the mode signal to "LOW", and performs both-sided scanning. Each of the front surface scanner unit 308 and the back surface scanner unit 309 converts, into analog image data, the reflected light beams of light beams with which a scanning target original is irradiated, and transfers them to the AFE 320 in the 2-ch parallel output mode.

The analog image data output from ch1 and ch3 of the front surface scanner unit 308 are input to ch1 and ch3 of the AFE 320, respectively. The AFE 320 samples/holds the analog image data transferred from the front surface scanner unit 308, and performs offset processing and signal amplification. The AFE 320 causes the MUX 450 to change the data parallelly input from the front surface scanner unit 308 every time data of one pixel (16 bits) is transferred, and transfers the analog image data to the A/D conversion circuit 350. The A/D conversion circuit 350 converts the transferred analog image data into digital image data, and outputs it with a 4-bit width to an image processing unit 300. The timing chart showing the output of the analog image data of an image sensor is the same as that in FIG. 5 described in the first embodiment.

Figure 13A:
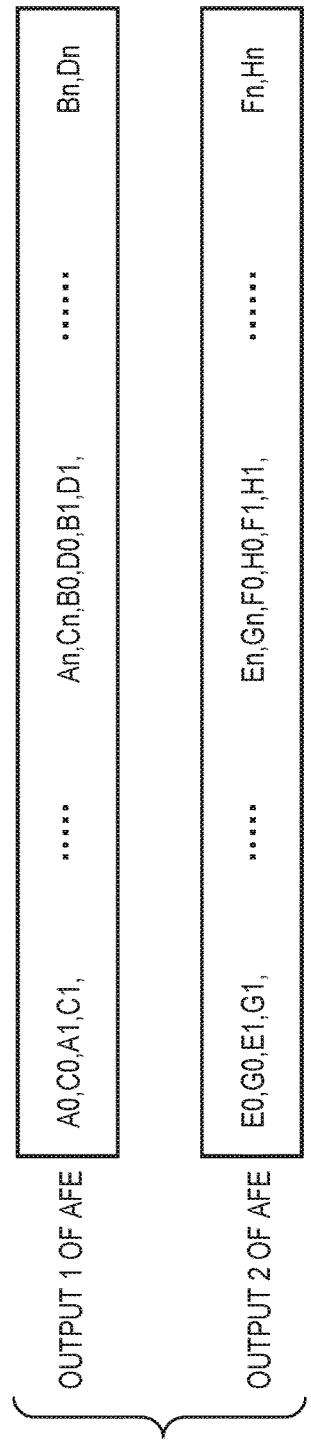
FIGS. 13A and 13B are views showing data processing at the time of concurrent both-sided scanning according to the second embodiment.
Figure 13B:
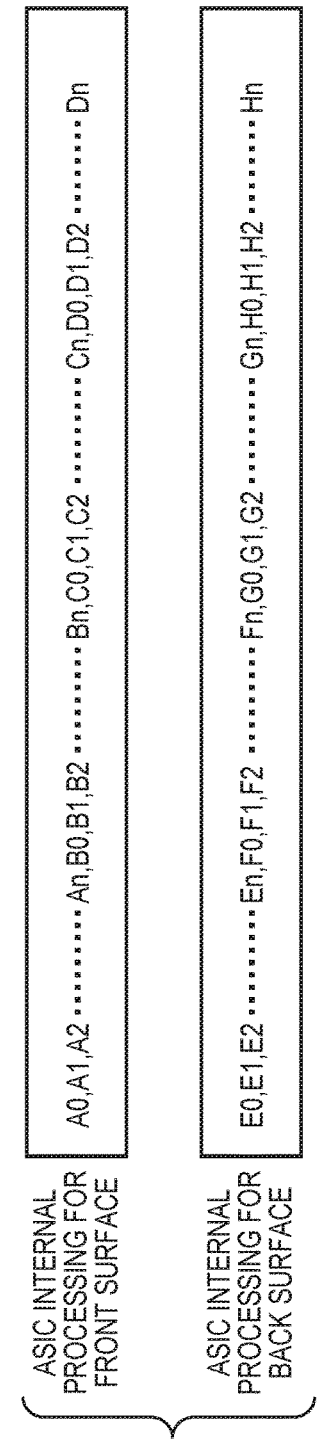

Assume that the analog image data are output from ch1 of the front surface scanner unit 308 in an order of A0, A1, A2, . . . , An, B0, B1, B2, . . . , and Bn. Assume also that the analog image data are output from ch3 of the front surface scanner unit 308 in an order of C0, C1, C2, . . . , Cn, D0, D1, D2, . . . , and Dn. In this case, as shown in FIG. 13A, data are output from output 1 of the AFE 320 in an order of A0, C0, A1, C1, . . . , An, Cn, B0, D0, B1, D1, . . . , Bn, and Dn. To form an image, the image processing unit 300 sorts the data in an order of A0, A1, A2, . . . , An, B0, B1, B2, . . . , Bn, C0, C1, C2, . . . , Cn, D0, D1, D2, . . . , and Dn, as indicated by front surface ASIC internal processing in FIG. 13B.

On the other hand, the analog image data output from ch1 and ch3 of the back surface scanner unit 309 are input to ch5 and ch6 of the AFE 320, respectively. The AFE 320 causes the MUX 450 to alternately change the data parallelly input from the back surface scanner unit 309 every time data of one pixel (16 bits) is transferred, and transfers the analog image data to the A/D conversion circuit 351. The A/D conversion circuit 351 converts the transferred analog image data into digital image data, and outputs it with a 4-bit width to the image processing unit 300.

Assume that the analog image data are output from ch1 of the back surface scanner unit 309 in an order of E0, E1, E2, . . . , En, F0, F1, F2, . . . , and Fn. Assume also that the analog image data are output from ch3 of the back surface scanner unit 309 in an order of G0, G1, G2, . . . , Gn, H0, H1, H2, . . . , and Hn. In this case, as shown in FIG. 13A, the data are output from output 2 of the AFE 320 in an order of E0, G0, E1, G1, . . . , En, Gn, F0, H0, F1, H1, . . . , Fn, and Hn. To form an image, the image processing unit 300 sorts the data in an order of E0, E1, E2, . . . , En, F0, F1, F2, . . . , Fn, G0, G1, G2, . . . , Gn, H0, H1, H2, . . . , and Hn, as indicated by back surface ASIC internal processing in FIG. 13B.

The image processing unit 300 is a circuit capable of 4-ch parallel processing, and can thus perform 4-ch parallel processing. At the time of concurrent both-sided scanning, input ch2 and ch4 of the MUX 450 are not selected (used), and no data are transferred to the succeeding stage.

On the other hand, when performing single-sided scanning, the image scanning apparatus sets the mode signal to "HIGH", and performs single-sided 4-parallel scanning. The analog image data output from ch1 to ch4 of the front surface scanner unit 308 are input to ch1 to ch4 of the AFE 320, respectively. The AFE 320 causes the MUX 450 to alternately change the data transferred from ch1 and ch2 of the front surface scanner unit 308 every time data of one pixel (16 bits) is transferred, and transfers the analog image data to the A/D conversion circuit 350. Furthermore, the AFE 320 causes the MUX 450 to alternately change the data transferred from ch3 and ch4 of the front surface scanner unit 308 every time data of one pixel (16 bits) is transferred, and transfers the analog image data to the A/D conversion circuit 351. Each of the A/D conversion circuits 350 and 351 converts the transferred data into digital image data, and outputs it with a 4-bit width to the image processing unit 300. The timing chart showing the output of the analog image data of the image sensor is the same as that in FIG. 8.

The analog image data are output from ch1 of the front surface scanner unit 308 in an order of A0, A1, A2, . . . , and An. The analog image data are output from ch2 of the front surface scanner unit 308 in an order of B0, B1, B2, . . . , and Bn. The analog image data are output from ch3 of the front surface scanner unit 308 in an order of C0, C1, C2, . . . , and Cn. The analog image data are output from ch4 of the front surface scanner unit 308 in an order of D0, D1, D2, . . . , and Dn. In this case, as shown in FIG. 14A, data are output from output 1 of the AFE 320 in an order of A0, B0, A1, B1, . . . , An, and Bn. Data are output from output 2 of the AFE 320 in an order of C0, D0, C1, D1, . . . , Cn, and Dn. To form an image, the image processing unit 300 sorts the data in an order of A0, A1, A2, . . . , An, B0, B1, B2, . . . , Bn, C0, C1, C2, . . . , Cn, D0, D1, D2, . . . , and Dn, as shown in FIG. 14B.

The image processing unit 300 is a circuit capable of 4-ch parallel processing, and can thus perform 4-ch parallel processing. At the time of single-sided scanning, input ch5 and ch6 of the MUX 450 are not selected (used), and no data are transferred to the succeeding stage.

As described above, in this embodiment, it is unnecessary to set the disable state, and thus it is unnecessary to input a front surface enable signal and a back surface enable signal to the image sensor, which is required in the first embodiment. Therefore, unlike the first embodiment, it is unnecessary to input enable signals to a sensor chip, thereby making it possible to simplify the arrangement.

As in the first embodiment, in this embodiment, at the time of single-sided scanning, the number of output channels of the front surface scanner unit 308 is increased. Instead of the back surface scanner unit 309, the front surface scanner unit 308 uses the A/D conversion circuit 351 which is used by the back surface scanner unit 309 at the time of both-sided scanning. That is, at the time of both-sided scanning, the front surface scanner unit 308 uses both the A/D conversion circuits 350 and 351 to use the A/D conversion circuit 351 at either the time of single-sided scanning or the time of both-sided scanning. This can reduce the time taken to output the digital image data to the image processing unit 300 at the time of single-sided scanning to half that at the time of both-sided scanning.

<Other Embodiments>

The present invention is not limited to the above-described embodiments. For example, in the above-described embodiments, the number of output channels of the front surface scanner unit 308 is two at the time of both-sided scanning, and is four at the time of single-sided scanning. The present invention, however, is not limited to this. For example, the number of the output channels of the front surface scanner unit 308 may be four at the time of both-sided scanning, and may be eight at the time of single-sided scanning. Furthermore, the number of AFEs may be four or more. Note that, in this case, the cost increases but the processing time can be shortened.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-026346, filed Feb. 15, 2016, which is hereby incorporated by reference herein in its entirety.

What is claimed is:

1. An image scanning apparatus which can execute scanning processes of both sides of an original in parallel, comprising:
   a first scanner for performing image scanning of a first surface of the original by receiving reflected light from the first surface and outputting analog signals, wherein the first scanner has a plurality of output channels;
   a second scanner for performing image scanning of a second surface of the original by receiving reflected light from the second surface and outputting analog signals, wherein the second scanner has a plurality of output channels;
   a control circuit for controlling output channels for outputting the analog signals of each of the first scanner and the second scanner; and
   a conversion circuit for converting, into digital signals, the analog signals output from at least one of the first scanner and the second scanner,
   wherein the control circuit changes, between a case of single-sided scanning and a case of both-sided scanning, the output channels of the analog signals output from a part of scanning region in a plurality of scanning regions of the first scanner, and changes the number of output channels for outputting the analog signals of each of the first scanner and the second scanner.

2. The apparatus according to claim 1, wherein the control circuit controls the number of output channels for outputting the analog signals of the first scanner so that the number for single-sided scanning is larger than the number for both-sided scanning.

3. The apparatus according to claim 1, wherein
   the first scanner includes a first scanning region and a second scanning region, and
   the control circuit performs control so that output channels of analog signals output from the first scanning region are the same for single-sided scanning and both-sided scanning, and output channels of analog signals output from the second scanning region are different for single-sided scanning and both-sided scanning.

4. The apparatus according to claim 3, wherein the control circuit performs control so that for both-sided scanning, the output channels of the analog signals output from the second scanning region are the same as the output channels of the analog signals output from the first scanning region.

5. The apparatus according to claim 4, wherein
the image scanning apparatus controls to input, in case of both-sided scanning, the analog signals from the first scanner to an input channel of the conversion circuit to which the analog signals are input from the second scanner, and
to output no signals from the output channels of the second scanner.

6. The apparatus according to claim 1, wherein the number of output channels of the first scanner in case of single-sided scanning is twice the number of output channels of the first scanner in case of both-sided scanning.

7. The apparatus according to claim 1, wherein
the conversion circuit includes a first conversion circuit and a second conversion circuit,
the first conversion circuit receives the output from the first scanner in case of single-sided scanning and the time of both-sided scanning, and
the second conversion circuit receives the output from the second scanner in case of both-sided scanning, and receives the output from the first scanner at the time single-sided scanning.

8. The apparatus according to claim 7, wherein the first conversion circuit and the second conversion circuit have the same number of input channels.

9. The apparatus according to claim 1, wherein
the number of input channels of the conversion circuit is given by a sum of a maximum number of output channels from which the first scanner can output the analog signals in parallel and the number of output channels from which the second scanner outputs the analog signals in case of both-sided scanning, and
the conversion circuit changes, in accordance with one of single-sided scanning and both-sided scanning, input channels for inputting the analog signals of the first scanner.

10. The apparatus according to claim 1, further comprising:
an image processing circuit for performing image processing using the digital signals converted by the conversion circuit,
wherein the image processing circuit performs the image processing by sorting, in an order corresponding to a scanning position of the original, the digital signals converted by the conversion circuit.

11. The apparatus according to claim 1, wherein the number of outputtable channels of the first scanner is larger than the number of outputtable channels of the second scanner.

12. The apparatus according to claim 1, wherein single-sided scanning is performed using the first scanner, and both-sided scanning is performed using the first scanner and the second scanner.

13. A multifunction apparatus including an image scanning apparatus which can execute scanning processes of both sides of an original in parallel, and a printing apparatus,
the image scanning apparatus comprising
a first scanner for performing image scanning of a first surface of the original by receiving reflected light from the first surface and outputting analog signals, wherein the first scanner has a plurality of output channels,
a second scanner for performing image scanning of a second surface of the original by receiving reflected light from the second surface and outputting analog signals, wherein the second scanner has a plurality of output channels,
a control circuit for controlling output channels for outputting the analog signals of each of the first scanner and the second scanner, and
a conversion circuit for converting, into digital signals, the analog signals output from at least one of the first scanner and the second scanner,
wherein the control circuit changes, between a case of single-sided scanning and a case of both-sided scanning, the output channels of the analog signals output from a part of scanning region in a plurality of scanning regions of the first scanner, and changes the number of output channels for outputting the analog signals of each of the first scanner and the second scanner.

14. An image scanning apparatus which can execute scanning processes of both sides of an original in parallel, comprising:
a first scanner for performing image scanning of a first surface of the original by receiving reflected light from the first surface and outputting analog signals, wherein the first scanner has a plurality of output channels;
a second scanner for performing image scanning of a second surface of the original by receiving reflected light from the second surface and outputting analog signals, wherein the second scanner has a plurality of output channels;
a control circuit for controlling output channels for outputting the analog signals of each of the first scanner and the second scanner; and
a conversion circuit for converting, into digital signals, the analog signals output from at least one of the first scanner and the second scanner,
wherein the control circuit changes, between a case of single-sided scanning and a case of both-sided scanning, the output channels of the analog signals output from a part of scanning region in a plurality of scanning regions of the first scanner.

15. An image scanning apparatus which can execute scanning processes of both sides of an original in parallel, comprising:
a first scanner for performing image scanning of a first surface of the original by receiving reflected light from the first surface and outputting analog signals, wherein the first scanner has a plurality of output channels;
a second scanner for performing image scanning of a second surface of the original by receiving reflected light from the second surface and outputting analog signals, wherein the second scanner has a plurality of output channels;
a control circuit for controlling output channels for outputting the analog signals of each of the first scanner and the second scanner; and
a conversion circuit for converting, into digital signals, the analog signals output from at least one of the first scanner and the second scanner,
wherein the control circuit changes, between a case of single-sided scanning and a case of both-sided scanning, the output channels of the analog signals output from a part of scanning region in a plurality of scanning regions of the first scanner, and controls the number of output channels for outputting the analog signals of each of the first scanner and the second scanner so that the number for single-sided scanning is larger than the number for both-sided scanning.

16. A control method for an image scanning apparatus which can execute scanning processes of both sides of an original in parallel using a first scanner that scans a first surface of the original and has a plurality of output channels and a second scanner that scans a second surface of the original and has a plurality of output channels,
 wherein the first scanner and the second scanner are configured to change output channels for outputting analog signals of the scanned original,
the method comprising:
controlling the output channels of each of the first scanner and the second scanner; and
converting the analog signals into digital signals,
wherein the output channels of the analog signals output from a part of scanning region in a plurality of scanning regions of the first scanner are changed between a case of single-sided scanning and a case of both-sided scanning, and the number of output channels for outputting the analog signals of each of the first scanner and the second scanner is changed between a case of single-sided scanning and a case of both-sided scanning.

* * * * *